US008903951B2

(12) United States Patent
Peek (10) Patent No.: US 8,903,951 B2
(45) Date of Patent: Dec. 2, 2014

(54) SPECULATIVE DATABASE AUTHENTICATION (75) Inventor: Daniel Nota Peek, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 359 days.

(21) Appl. No.: 13/181,405

(22) Filed: Jul. 12, 2011

(65) Prior Publication Data

US 2013/0018989 A1 Jan. 17, 2013

(51) Int. Cl.
*G06F 15/16* (2006.01)
*H04L 29/06* (2006.01)

(52) U.S. Cl.
CPC ........ *H04L 63/0884* (2013.01); *H04L 63/1441* (2013.01)
USPC ............ 709/219; 709/223; 709/224; 709/225

(58) Field of Classification Search
CPC .................................................. H04L 63/1441
USPC .................. 709/219, 223, 224, 225
See application file for complete search history.

(56) References Cited

U.S. PATENT DOCUMENTS

| | | | |
|---|---|---|---|
| 5,857,188 A | 1/1999 | Douglas | |
| 6,434,543 B1 | 8/2002 | Goldberg et al. | |
| 6,615,221 B2 | 9/2003 | Warner et al. | |
| 6,772,363 B2 | 8/2004 | Pedone et al. | |
| 6,801,919 B2 | 10/2004 | Hunt et al. | |
| 7,206,805 B1 | 4/2007 | McLaughlin, Jr. | |
| 7,490,162 B1 | 2/2009 | Masters | |
| 7,702,739 B1 | 4/2010 | Cheng et al. | |
| 8,069,469 B1 * | 11/2011 | Atieh et al. ........................ 726/2 |
| 8,280,881 B1 | 10/2012 | Zhou et al. | |
| 2003/0204593 A1 | 10/2003 | Brown et al. | |
| 2004/0215746 A1 | 10/2004 | McCanne et al. | |
| 2006/0053065 A1 | 3/2006 | Bowman et al. | |
| 2007/0061329 A1 | 3/2007 | Moutafov | |
| 2007/0226276 A1 | 9/2007 | Suzuki et al. | |
| 2007/0239713 A1 | 10/2007 | Leblang et al. | |
| 2008/0013702 A1 | 1/2008 | Melideo | |
| 2008/0033930 A1 | 2/2008 | Warren | |
| 2008/0320151 A1 | 12/2008 | McCanne et al. | |
| 2009/0138448 A1 | 5/2009 | Barsness et al. | |
| 2009/0216718 A1 | 8/2009 | Agrawal et al. | |
| 2010/0185649 A1 | 7/2010 | Zhou et al. | |
| 2010/0217793 A1 | 8/2010 | Preiss | |
| 2012/0254155 A1 | 10/2012 | Heim et al. | |

OTHER PUBLICATIONS

Nightingale, et al. "Speculative Execution in a Distributed File System", 15 pages, Oct. 26, 2005.
USPTO, *Office Action*, U.S. Appl. No. 13/181,388, filed Jul. 12, 2011, in re: Daniel Nota Peek (20 pgs), Apr. 18, 2013.
USPTO, *Office Action*, U.S. Appl. No. 13/181,396, filed Jul. 12, 2011, in re: Daniel Nota Peek (11 pgs), Jun. 3, 2013.

(Continued)

*Primary Examiner* — Adnan Mirza
(74) *Attorney, Agent, or Firm* — Baker Botts L.L.P.

(57) ABSTRACT

Speculative processing of authentication messages may include transmitting a first series of simultaneous messages to a database client, the first series of simultaneous messages including a handshake message and a first authentication acknowledgement message, receiving a second series of simultaneous messages from the database client, the second series of simultaneous messages including an authentication message and a database message, and transmitting a database acknowledgment message to the database client. In some implementations, the second series of simultaneous messages is received from the database client substantially without delay after the transmission of the first series of simultaneous messages.

15 Claims, 5 Drawing Sheets

(56) References Cited

OTHER PUBLICATIONS

USPTO, *Office Action*, U.S. Appl. No. 13/181,416, filed Jul. 12, 2011, in re: Daniel Nota Peek; (22 pgs), Apr. 1, 2013.

USPTO, *Office Action*, U.S. Appl. No. 13/181,388, filed Jul. 12, 2011, in re: Daniel Nota Peek (23 pgs), Jun. 13, 2013.

Wester, et al., "Tolerating latency in replicated state machines through client speculation", NSDI '09: 6th USENIX Symposium on Networked Systems Design and Implementation, 2009, pp. 245-260.

Nightingale, et al., "Rethink the Sync", 14 pages.

*USPTO Final Office Action* for U.S. Appl. No. 13/181,388, 20 pages, Apr. 18, 2013.

*USPTO Final Office Action* for U.S. Appl. No. 13/181,416, 12 pages, Sep. 11, 2013.

*USPTO Final Office Action* for U.S. Appl. No. 13/181,388, 22 pages, Sep. 20, 2013.

*Notice of Appeal and Pre-Appeal Brief Request for Review*, U.S. Appl. No. 13/181,388, (6 pgs), Dec. 20, 2013.

*USPTO Non-Final Office Action* for U.S. Appl. No. 13/181,388, (24 pgs), Oct. 25, 2012.

*Response Pursuant to C.F.R.§ 1.111* for U.S. Appl. No. 13/181,388, (9 pgs), Mar. 25, 2013.

*Response Accompanying Request for Continued Examination (RCE)* for U.S. Appl. No. 13/181,388, (8 pgs), Jun. 5, 2013.

*Response Pursuant to C.F.R.§ 1.111 Action* for U.S. Appl. No. 13/181,388 (8 pgs), Sep. 12, 2013.

*Response Pursuant to C.F.R.§ 1.111* for U.S. Appl. No. 13/181,396, (8 pgs), Sep. 3, 2013.

*USPTO Final Office Action* for U.S. Appl. No. 13/181,396, (16 pgs), Dec. 23, 2013.

*USPTO Notice of Allowance and Fee(s) Due* for U.S. Appl. No. 13/181,416, (12 pgs), Nov. 20, 2013.

\* cited by examiner

SPECULATIVE DATABASE AUTHENTICATION

TECHNICAL FIELD

The present disclosure generally relates to databases and, more particularly to speculative authentication for database transactions.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view web pages created or customized by other users where visibility and interaction with such pages by other users is governed by some characteristic set of rules.

Such social networking information, and most information in general, is typically stored in relational databases. Generally, a relational database is a collection of relations (frequently referred to as tables). Relational databases use a set of mathematical terms, which may use Structured Query Language (SQL) database terminology. For example, a relation may be defined as a set of tuples that have the same attributes. A tuple usually represents an object and information about that object. A relation is usually described as a table, which is organized into rows and columns. Generally, all the data referenced by an attribute are in the same domain and conform to the same constraints.

The relational model specifies that the tuples of a relation have no specific order and that the tuples, in turn, impose no order on the attributes. Applications access data by specifying queries, which use operations to identify tuples, identify attributes, and to combine relations. Relations can be modified and new tuples can supply explicit values or be derived from a query. Similarly, queries identify may tuples for updating or deleting. It is necessary for each tuple of a relation to be uniquely identifiable by some combination (one or more) of its attribute values. This combination is referred to as the primary key. In a relational database, all data are stored and accessed via relations. Relations that store data are typically implemented with or referred to as tables.

Relational databases, as implemented in relational database management systems, have become a predominant choice for the storage of information in databases used for, for example, financial records, manufacturing and logistical information, personnel data, and other applications. As computer power has increased, the inefficiencies of relational databases, which made them impractical in earlier times, have been outweighed by their ease of use for conventional applications. The three leading open source implementations are MySQL, PostgreSQL, and SQLite. MySQL is a relational database management system (RDBMS) that runs as a server providing multi-user access to a number of databases. The "M" in the acronym of the popular LAMP software stack refers to MySQL. Its popularity for use with web applications is closely tied to the popularity of PHP (the "P" in LAMP). Several high-traffic web sites use MySQL for data storage and logging of user data.

Using databases involves a series of messages that enable a database user to interact with a database. For example, a database transaction may involve messaging associated with setting up connections to a database, authentication, querying the database, switching databases, committing transactions to the database, and terminating connections with the database.

SUMMARY

In accordance with the present disclosure, disadvantages and problems associated with processing of authentication messages may be reduced or eliminated.

According to one embodiment, speculative processing of authentication messages includes transmitting a first series of simultaneous messages to a database client, the first series of simultaneous messages including a handshake message and a first authentication acknowledgement message, receiving a second series of simultaneous messages from the database client, the second series of simultaneous messages including an authentication message and a database message, and transmitting a database acknowledgment message to the database client. In some implementations, the second series of simultaneous messages is received from the database client substantially without delay after the transmission of the first series of simultaneous messages.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1A:
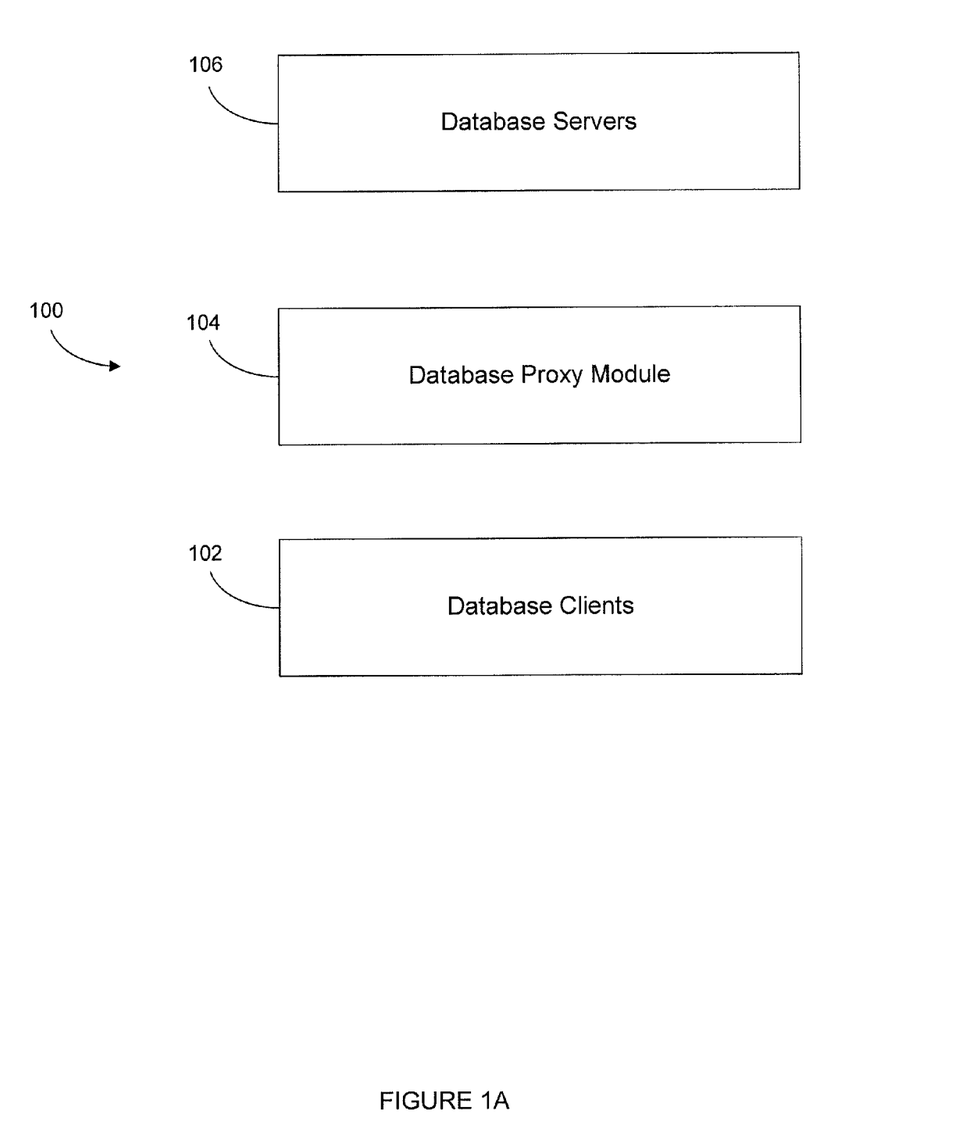
FIG. 1A illustrates example devices involved in a database transaction.

FIG. 1A illustrates a system 100 of example components involved in a database transaction. As illustrated, system 100 includes database clients 102, a database proxy module 104, and database servers 106. In appropriate environments, these components interoperate to facilitate database transactions between database clients 102 and a database server 106. For example, database clients 102 may transmit and receive messages from database server 106 using database proxy module 104, and thereby access, retrieve, and store information in a database residing on database server 106. The database proxy module 104 may facilitate and assist in the processing of database transactions between database clients 102 and database servers 106. In particular embodiments, database proxy module 104 is operable to speculatively process authentication messages with database clients 102 on behalf of database servers 106. In other embodiments, the database server 106 may be configured to speculatively process authentication messages with database clients 102.

Figure 1B:
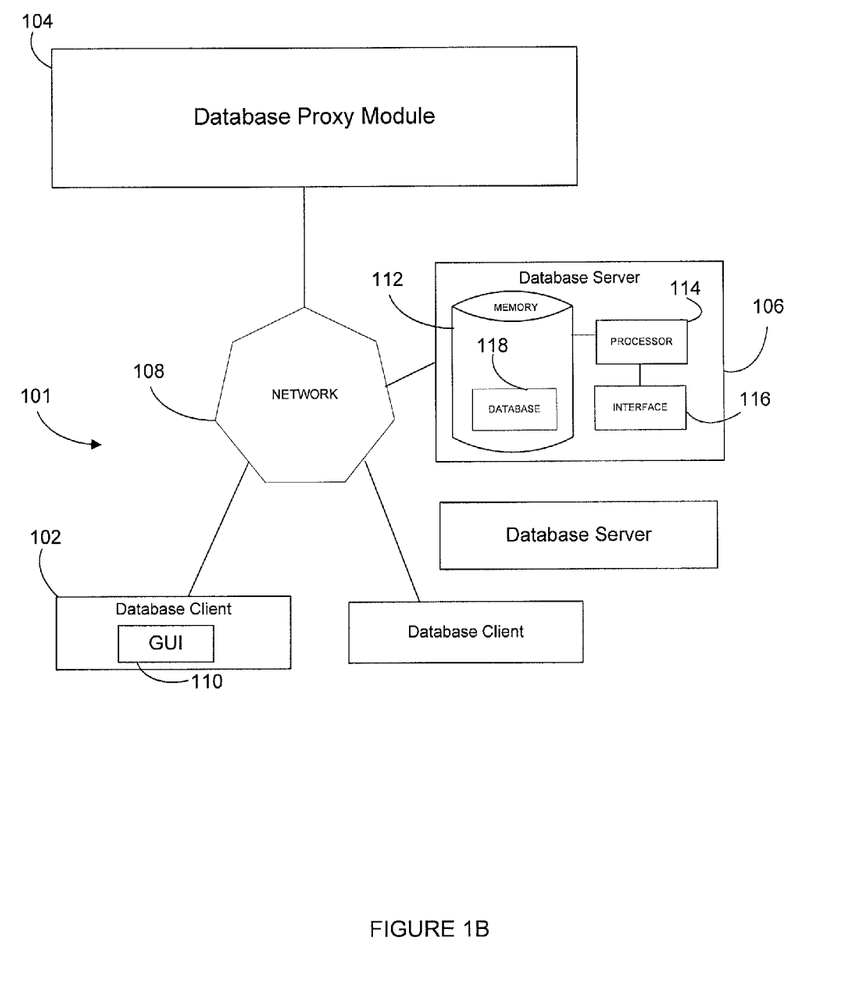
FIG. 1B illustrates an example database environment.

FIG. 1B illustrates a system 101 of an example database environment in which embodiments of the present disclosure may operate. In the illustrated embodiment, system 101 may speculatively process authentication messages and thereby expedite processing of subsequent database transactions. In general, authentication messages may refer to those messages that confirm the authenticity of a user. In the database context, a database server 106 may challenge the authenticity of a database client 102, either directly or through a database proxy module 104. For example, a authentication challenge may be issued on connection establishment. An authentication challenge may involve the transmission of a series of simultaneous database authentication messages such as a handshake, a database authentication message, and/or a hash, and receiving responses to those messages. For example, database servers 106 and/or database proxy module 104 may speculatively acknowledge a series of simultaneous authentication messages without substantial processing or verification, thereby expediting the processing of database transactions that follow authentication. The illustrated system 101 facilitates speculative authentication in a manner that is efficient and decreases the delay associated with back-and-forth authentication messaging.

Database clients 102 represent computer systems including appropriate hardware, control logic, and data that may be used to interface with other system components, such as database proxy module 104 or database servers 106, using network 108. For example, database clients 102 may represent web servers, mainframe computers, workstations, laptops, netbooks, tablet computers, personal data assistants, (PDAs), mobile phones, mainframes, and any other suitable computing device capable of interacting with a database using appropriate messaging and/or database transactions. Database clients 102 may support a wide array of operations, including but not limited to, web browsing, word processing, querying databases, and processing results retrieved from databases. According to particular embodiments, database clients 102 may provide access, potentially through web-based interfaces, to information managed by other elements such as database proxy module 104 and database servers 106.

As illustrated, database clients 102 may include a graphical user interface 110. Graphical user interface 110 represents any appropriate interface for receiving and displaying information to a user of system 100. Graphical user interface 110 may be any appropriate combination of hardware and/or software to facilitate a user's interaction with database clients 102. In particular embodiments, database clients 102 are web servers that issue a series of database requests in order to deliver web pages to requesting network users. For example, a social networking user may request that a web server deliver a web page associated with another social networking user. In such an example, the web server may issue a number of database queries to populate the requested web page with relevant information. Database clients 102 may receive and process a series of simultaneous authentication messages received in quick succession. In some embodiments, database clients 102 may respond to those messages with another series of simultaneous responsive messages, which may also be transmitted in quick succession without substantial processing. Accordingly, in certain embodiments, database clients 102 may interact with database proxy module 104 and/or database servers 106 in order to expedite authentication messaging.

Network 108 represents any suitable communications network operable to facilitate communication between the components of system 101, such as database clients 102, database servers 106, and database proxy module 104. Network 108 may include any interconnecting system capable of transmitting audio/video signals, data, messages or any other combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between components of system 101. Network 108 may include any combination of gateways, routers, hubs, switches, access points, base stations, wireless telephone systems and any other hardware, software or combination thereof.

Database proxy module 104 represents suitable hardware components, control logic, and data for processing database transactions to and from database servers 106 and database clients 102. As illustrated, database proxy module 104 may be communicatively coupled to other components of system 101, such as database servers 106 and database clients 102, by a network 108. In particular embodiments, database proxy module 104 speculatively authenticate database clients by issuing a series of simultaneous authentication messages in immediate succession and responding to one or more subsequent messages in a series of simultaneous messages from database clients 102, with an immediate acknowledgement and without substantial processing. While database proxy module 104 may unconditionally authenticate database clients, it may nevertheless await confirmation from database servers 106 before forwarding database transactions, such as database queries, to database servers 106. Database proxy module 104 will be discussed in further detail in FIG. 2.

Database servers 106 represent suitable hardware components, control logic, and data for managing information in one or more databases. For example, database servers 106 may be any suitable combination of computer servers and networking devices, whether real or virtual. In particular embodiments, database servers 106 may manage data associated with a social networking website. For example, database servers 106 may manage data corresponding to users of a social networking website in the form of text, audio, video, and images. Database servers 106 may also retain information including configurations, settings, rules and policies associated with the managed data and/or particular users or groups. Database servers 106 may employ one or more relational databases for storing various types of information in a manner that is accessible and easily retrievable upon request. In certain embodiments, database servers 106 are operable to perform speculative authentication and processing according to the present disclosure.

As illustrated, database servers 106 may include various interconnected elements including a memory 112, a processor 114, and an interface 116. Memory 112 represents any suitable combination of volatile or non-volatile, local or remote devices suitable for storing information. For example, memory 112 may include random access memory (RAM), read only memory (ROM), magnetic storage devices, optical storage devices, or any other suitable information storage device or a combination of such devices. Memory 112 may maintain appropriate control logic and rules for controlling the operation of database servers 106. As illustrated, memory 112 may include a database 118 for storing and organizing various types of data. In particular embodiments, database 118 represents a relational database for storing information, such as social networking information, in an easily retrievable format. For example, database 118 may represent a SQL database for storing various types of information.

Processor 114 represents any hardware and/or software that communicatively couples to memory 112 and interface 116, and controls the operation and administration of database servers 106. For example, processor 114 may execute appropriate software to control the operation of database servers 106. Processor 114 may be a programmable logic device, a microcontroller, a microprocessor, any other appropriate processing device, or any suitable combination of the preceding.

Interface 116 represents any suitable device operable to receive information from network 108, transmit information through network 108, perform processing of received or transmitted information, communicate to other devices or any combination of the preceding. Interface 116 represents any port or connection, real or virtual including any suitable hardware and/or software including protocol conversion and data processing capabilities to communicate through a LAN, WAN or other communication systems that allow database servers 106 to exchange information with network 108, database clients 102 and database proxy module 104. For example, interface 116 may receive requests for database transactions associated with database 118 from database clients 102. According to particular embodiments, interface 116 may receive database queries from database clients 102 and/or database proxy module 104, for appropriate processing by processor 114 of the information stored in database 118 of memory 112.

In certain embodiments, database proxy module 104 maintains a pool of database connections between itself and one or more database servers located at one or more database servers 106. According to particular implementations, the database connections may be in an active or idle states with respect to particular databases at database servers 106. In particular embodiments, database proxy module 104 may harness a pool of database connections, as appropriate, to process and respond to database transactions received from database clients 102. For example, database proxy module 104 may multiplex database transactions received from different database clients 104 onto a particular database connection selected from the pool of database connections existing between database proxy module 104 and database servers 106. Thus, particular embodiments of the present disclosure facilitate using database connection pooling to improve the performance of database transactions.

In exemplary embodiments, database proxy module 104 transmits a series of simultaneous authentication messages in immediate succession to database clients 102, processes a series of simultaneous response messages to those queries, and without substantial delay, transmit an acknowledgement to database client 102. In other embodiments, database servers 106 are operable to perform such functions. Accordingly, database clients 102, database proxy module 104, and database servers 106 may work together to speculatively authenticate database clients, thereby expediting subsequent database transactions and minimizing any transaction delays.

A component of systems 100 and 101 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of system 100 and 101 and the components within systems 100 and 101.

While systems 100 and 101 are illustrated as including specific components arranged in a particular manner, it should be understood that various embodiments may operate using any suitable arrangement and collection of components capable of performing functionality such as that described. For example, a database server 106 may also be database proxy module 104.

Figure 2:
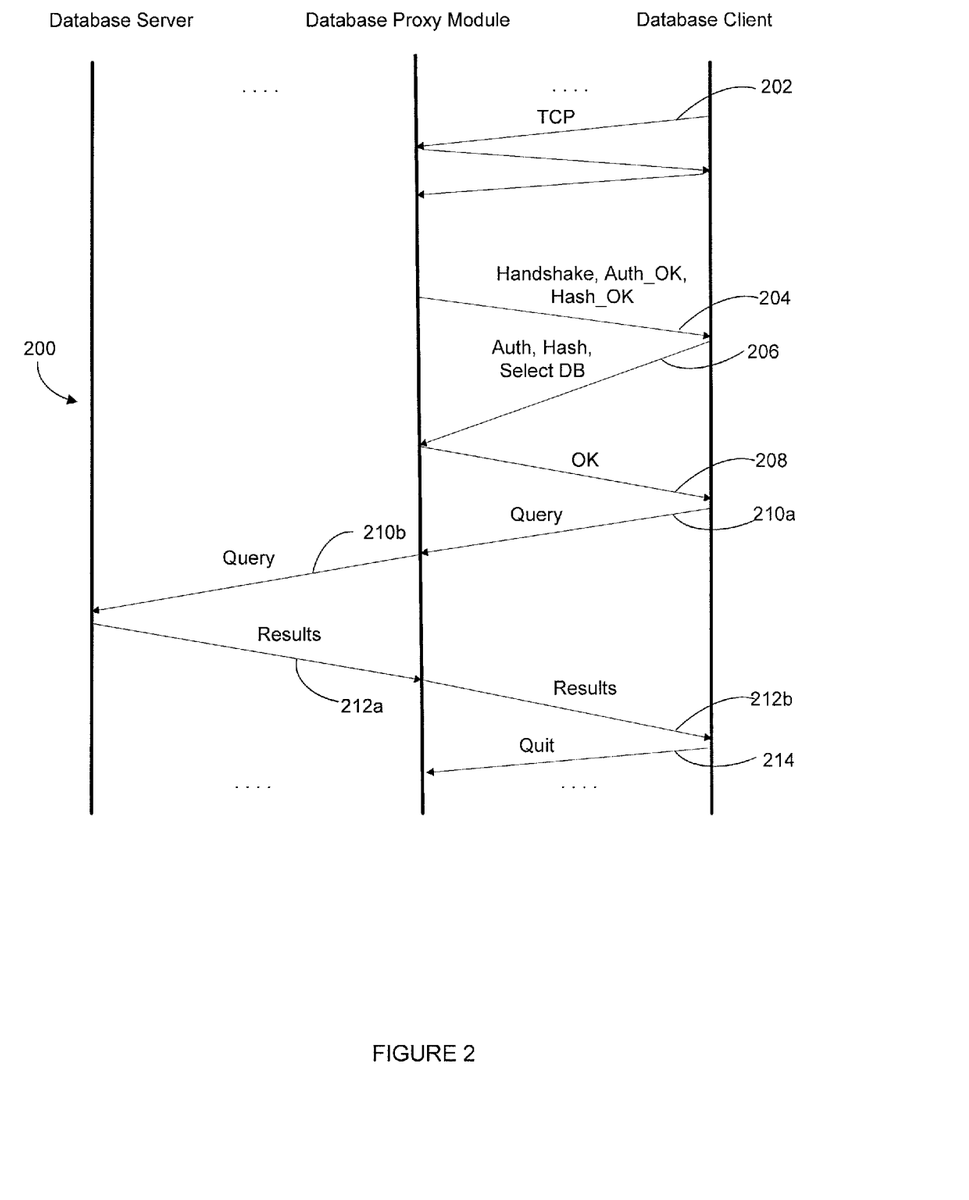
FIG. 2 illustrates a messaging sequence of an example embodiment.

FIG. 2 is a schematic diagram of an example messaging sequence 200 for speculative authentication of database clients, such as database clients 102. As illustrated, a transport layer connection 202 may be established between database client 102 and database proxy module 104. In particular embodiments, this transport layer protocol may conform to the transport control protocol (TCP) of the TCP/IP protocol suite. Following the establishment of a transport layer connection, database proxy module 104 may challenge the authenticity of database client 102 using a series of messages upon first connection to database proxy module 104. As illustrated, database proxy module may transmit a first series of messages 204 including a handshake message, an authentication acknowledgement message, and/or a hash acknowledgment message. In particular embodiments, these messages may be simultaneously transmitted in immediate succession or as part of the same message. Transmitting in immediate succession may refer to transmitting simultaneously, unconditionally, automatically, without substantial delay, and/or without considerable processing.

In response to these quick succession of messages, database client 102 may respond with a second series of messages 206, including an authentication message, a hash message, and/or a database message. For example, the database message may be a select database message as shown in messaging sequence 200. In certain embodiments, the database message may be some other database message. As illustrated, these messages may also be simultaneously transmitted in immediate succession. In response to the second series of authentication messages 206, database proxy module 104 may respond by transmitting a response to the database message, such as a select database acknowledgment message 208, without substantial delay or processing. As shown, the transmission of the first series of simultaneous authentication messages 204, and the transmission of the select database acknowledgment message 208 immediately upon receipt of the second of authentication messages 206 facilitates speculative authentication. For example, such messaging streamlines the authentication process and may obviate the need for multiple back-and-forth authentication messaging which typically suffers from transmission and processing delays.

In particular embodiments, database proxy module 104 may not process or forward any database queries from database client 102 until database proxy module 104 receives an authentication acknowledgement of database client 102 with database server 106. After database proxy module authenticates database client 102 with database server 106 using appropriate messaging protocols, certain embodiments of database proxy module 104 may entertain any number of database transactions, such as database queries. In other embodiments, database proxy module 104 may reuse an existing database connection between database proxy module 104 and database server 106, and may not need to perform separate authentication for a new database client 102. In such embodiments, database proxy module 104 may have the information necessary to independently authenticate database client 102 and may not need to consult database sever 106 to authenticate database client 102.

For example, database proxy module 104 may receive a database query 210*a* from database client 102 and forward that database query as database query message 210*b* to database server 106. In response, database server 106 may transmit the database results for database query message 210*b* as database results 212*a*. Upon receiving database results message 212*a*, database proxy module 104 may forward those results in a database results message 212*b* to database client 102. Following any number of database queries, database client 102 may issue a quit message 214 to terminate the connection between database client 102 and data proxy module 104 and/or database servers 106.

While messaging sequence 200 has illustrated as including specific types of messages arranged in a particular sequence, it should be understood that various embodiments may operate using any suitable arrangement or collection of messaging capable of providing functionality such as that described.

Figure 3:
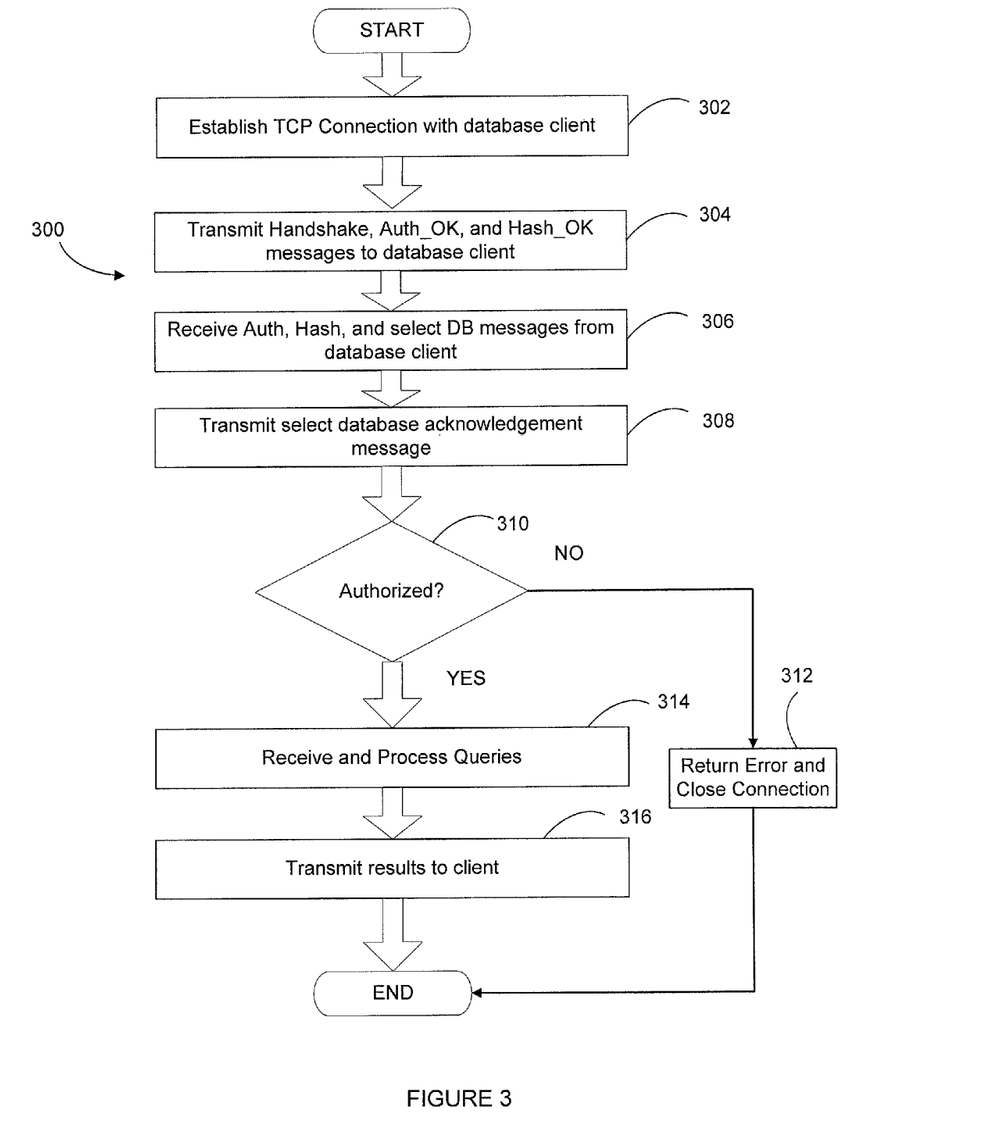
FIG. 3 illustrates a flowchart of an example embodiment.

FIG. 3 illustrates an example flow chart for a process flow 300 for speculatively authenticating database clients. As illustrated, process flow 300 begins at step 302, when a transport layer connection is established between a database client 102 and a database proxy module 104. Such a transport layer connection, in particular embodiments, may be associated with a backend database connection between database proxy module 104 and database server 106. In certain embodiments, the transport layer connection between database client 102 and database proxy module 104 facilitates any number of database transactions between database client 102 and database servers 106. Next, at step 304, database proxy module 104 may transmit a series of simultaneous messages in order to authenticate database client 102. For example, database proxy module 104 may transmit a handshake message, authentication acknowledgment message, and/or a hash acknowledgment message to database client 102. As discussed above, these messages may be sent in immediate succession without any intervening authentication messages being received or without considerable processing. In such embodiments, transmission of such a series of simultaneous authentication messages facilitates expedited processing or subsequent queries.

At step 306, database proxy module 104 receives a series of simultaneous messages including an authentication message, a hash message, and/or a first database message. As illustrated, the first database message may be a select database message. In response to the messages received in step 306, database proxy module 104 may transmit a database acknowledgement message, such as a select database acknowledgment message, at step 308. In particular embodiments, database proxy module 104 transmits the database acknowledgment message without substantial delay or processing. As discussed above, the simultaneous transmission of the series of messages in immediate succession in step 304 (e.g., the handshake message, the authentication acknowledgment message, and/or the hash acknowledgment message) along with the transmission of an immediate database acknowledgment message in step 308 upon receiving the second series of simultaneous messages in step 306 (e.g., the authentication message, the hash message, and/or the select database message), facilitates expedited processing of subsequent database transactions.

In step 310, database proxy module 104 determines whether database client 102 is in fact authorized to communicate with database server 106. In particular embodiments, this may involve another series of messaging between database proxy module 104 and database server 106. If database proxy module 104 determines that database client 102 is not authorized, it will return an error to the database client 102 and terminate the database connection at step 312. If, however, database client 102 is authorized, database proxy module 104 may entertain any appropriate number of database queries. For example, in step 314, database proxy module 104 may receive and process database queries from database client 102. To process these queries, database proxy module 104 may forward any received database queries to database server 106. Once the database results responding to the database queries are received by database module 104, database proxy module 104 may forward those results to database client 102 in step 316.

While process flow 300 is illustrated as including specific steps arranged in a particular sequence, it should be understood that various embodiments may operate using any suitable arrangement and collection of steps capable of providing functionality such as that described.

Figure 4:
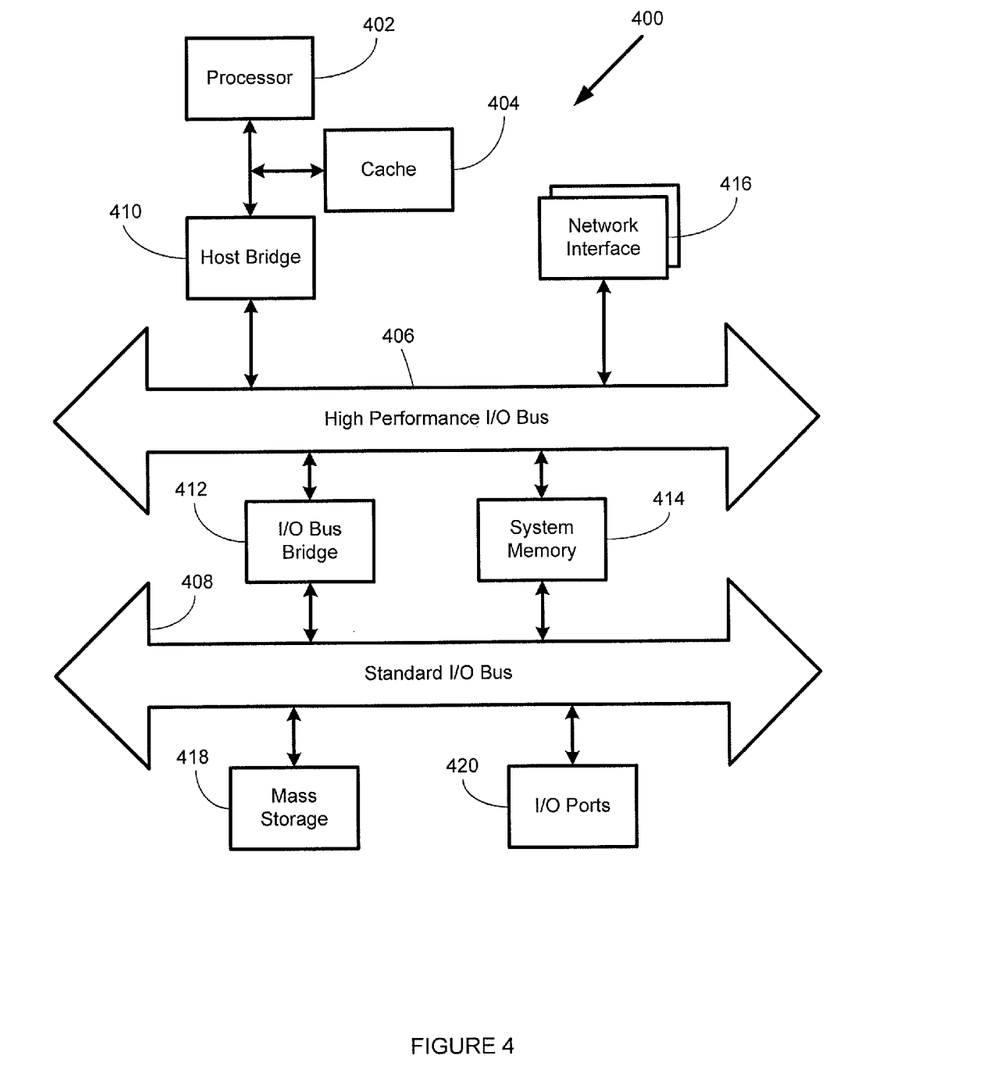
FIG. 4 illustrates an example computer system.

FIG. 4 illustrates an example computer system 400. In particular embodiments, computer system 400 is a computer server that runs all or part of a functionality related to a speculative authentication system. In particular embodiments, computer system 400 may represent the hardware architecture of database clients 102, database proxy module 104, and/or database servers 106. In one embodiment, hardware system 400 includes a processor 402, a cache memory 404, and one or more software applications and drivers directed to the functions described herein. Additionally, hardware system 400 includes a high performance input/output (I/O) bus 406 and a standard I/O bus 408. A host bridge 410 couples processor 402 to high performance I/O bus 406, whereas I/O bus bridge 412 couples the two buses 406 and 408 to each other. A system memory 414 and a network/communication interface 416 couple to bus 406. Hardware system 400 may further include video memory (not shown) and a display device coupled to the video memory. Mass storage 418 and I/O ports 420 couple to bus 408. In one embodiment, hardware system 400 may also include a keyboard and pointing device 422 and a display 424 coupled to bus 408. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 400 are described in greater detail below. In particular, network interface 416 provides communication between hardware system 400 and any of a wide range of networks, such as an Ethernet (e.g., IEEE 802.3) network. Mass storage 418 provides permanent storage for the data and programming instructions to perform the functions described herein, whereas system memory 414 (e.g., DRAM) provides temporary storage for the data and programming instructions when executed by processor 402. I/O ports 420 are one or more serial and/or parallel communication ports that provide communication between additional peripheral devices, which may be coupled to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain embodiments of the present disclosure may not require nor include all of the above components. For example, the peripheral devices shown coupled to standard I/O bus 408 may couple to high performance I/O bus 406. In addition, in some embodiments only a single bus may exist with the components of hardware system 400 being coupled to the single bus. Furthermore, hardware system 400 may include additional components, such as additional processors, storage devices, or memories.

In particular embodiments, the speculative authentication system, as well as other computer-implemented operations described herein includes a series of software routines run by hardware system 400. These software routines include a plurality or series of instructions to be executed by a processor in a hardware system, such as processor 402. Initially, the series of instructions are stored on a storage device, such as mass storage 418. However, the series of instructions can be stored on any suitable storage medium, such as a diskette, CD-ROM, ROM, or EEPROM. Furthermore, the series of instructions need not be stored locally, and could be received from a remote storage device, such as a server on a network, via network/communication interface 416. The instructions are copied from the storage device, such as mass storage 418, into memory 414 and then accessed and executed by processor 402.

An operating system manages and controls the operation of hardware system 400, including the input and output of data to and from software applications (not shown). The operating system provides an interface between the software applications being executed on the system and the hardware components of the system. According to one embodiment of the present disclosure, the operating system is the LINUX operating system. However, embodiments of the present disclosure may be used with other suitable operating systems, such as the Windows® 95/98/NT/XP/Vista/7 operating system, available from Microsoft Corporation of Redmond, Wash., the Apple Macintosh Operating System, available from Apple Computer Inc. of Cupertino, Calif., UNIX operating systems, and the like.

Particular embodiments may be implemented on one or more computer systems. FIG. 4 illustrates an example computer system 400 that may be used to implement a server. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A non-transitory computer readable medium comprising instructions, the instructions operable when executed by a processor to:
   receive a connection request from a database client;
   establish a transport layer connection with the database client;
   send, by the connection, a first group of messages to the database client, wherein the first group of messages comprises a handshake message, an authentication acknowledgement message, and a hash acknowledgement message;
   receive, by the connection, a second group of messages from the database client, wherein the second group of messages comprises an authentication message and a hash message;
   send, by the connection, a database connection acknowledgment message to the database client; and
   before processing any database queries received from the database client, determine whether the database client is authorized to submit database queries and, if the database client is not authorized, send a database connection termination message to the database client.

2. The non-transitory computer readable medium of claim 1, the instructions further operable when executed by a processor to receive a database message from the database client, wherein the database message is a select database message and the database acknowledgement message is a select database acknowledgement message.

3. The non-transitory computer readable medium of claim 1, wherein the second group of messages is received from the database client substantially without delay after the first group of messages are sent.

4. The non-transitory computer readable medium of claim 1, wherein the database acknowledgement message to the database client is sent substantially without delay after receiving the second group of messages.

5. The non-transitory computer readable medium of claim 1, wherein the instructions are further operable when executed by the processor to:
   receive a database query from the database client;
   forward the database query to the database server;
   receive database results corresponding the database query from the database server; and
   forward the database results to the database client.

6. A apparatus, comprising:
   an interface operable to communicate authentication messages;
   a memory operable to store authentication messages;
   a processor communicatively coupled to the interface and the memory, the processor operable to:
      receive a connection request from a database client;
      establish a transport layer connection with the database client;
      send, by the connection, a first group of messages to the database client, wherein the first group of messages comprises a handshake message, an authentication acknowledgement message, and a hash acknowledgement message;
      receive, by the connection, a second group of messages from the database client, wherein the second group of messages comprises an authentication message and a hash message;
      send, by the connection, a database connection acknowledgement message to the database client; and before processing any database queries received from the database client, determine whether the database client is authorized to submit database queries and, if the database client is not authorized, send a database connection termination message to the database client.

7. The apparatus of claim 6, the processor further operable to receive a database message from the database client, wherein the database message is a select database message and the database acknowledgement message is a select database acknowledgement message.

8. The apparatus of claim 6, wherein the second group of messages is received from the database client substantially without delay after the first group of messages are sent.

9. The apparatus of claim 6, wherein the database acknowledgement message to the database client is sent substantially without delay after receiving the second group of messages.

10. The apparatus of claim 6, wherein the instructions are further operable when executed by the processor to:
 receive a database query from the database client;
 forward the database query to the database server;
 receive database results corresponding the database query from the database server; and
 forward the database results to the database client.

11. A method, comprising:
 receiving a connection request from a database client;
 establishing a transport layer connection with the database client;
 sending, by the connection, a first group of messages to the database client, wherein the first group of messages comprises a handshake message, an authentication acknowledgement message, and a hash acknowledgement message;
 receiving, by the connection, a second group of messages from the database client, wherein the second group of messages comprises an authentication message and a hash message;
 sending, by the connection, a database connection acknowledgement message to the database client; and
 before processing any database queries received from the database client, determine whether the database client is authorized to submit database queries and, if the database client is not authorized, send a database connection termination message to the database client.

12. The method of claim 11, further comprising receiving a database message from the database client, wherein the database message is a select database message and the database acknowledgement message is a select database acknowledgement message.

13. The method of claim 11, wherein the second group of messages is received from the database client substantially without delay after the first group of messages are sent.

14. The method of claim 11, wherein the database acknowledgement message to the database client is sent substantially without delay after receiving the second group of messages.

15. The method of claim 11, wherein the instructions are further operable when executed by the processor to:
 receive a database query from the database client;
 forward the database query to the database server;
 receive database results corresponding the database query from the database server; and
 forward the database results to the database client.

* * * * *